United States Patent [19]

Mino et al.

[11] 3,813,484

[45] May 28, 1974

[54] MAGNETIC TAPE REPRODUCING SYSTEM FOR STOP MOTION VIDEO WITH AUDIO

[75] Inventors: Mineo Mino; Kiyoji Fujisawa; Kenzo Ianabe, all of Osaka, Japan

[73] Assignee: Matsushita Electric Industrial Co., Ltd., Osaka, Japan

[22] Filed: Mar. 22, 1973

[21] Appl. No.: 343,674

[52] U.S. Cl......... 178/6.6 FS, 178/5.4 CD, 178/5.6, 178/6.6 A, 178/6.6 P

[51] Int. Cl............................................. H04n 5/78

[58] Field of Search............ 178/6.6 FS, 6.6 A, 5.6, 178/5.8 R, 5.4 CD, 6.6 P, 69.5 F

[56] References Cited

UNITED STATES PATENTS

| | | | |
|---|---|---|---|
| 3,283,068 | 11/1966 | Umy | 178/6.6 A |
| 3,294,902 | 12/1966 | Maxey | 178/6.6 FS |
| 3,397,283 | 8/1968 | Stosburg | 178/6.6 FS |
| 3,715,481 | 2/1973 | Harr | 178/6.6 FS |

*Primary Examiner*—Raymond F. Cardillo, Jr.
*Attorney, Agent, or Firm*—Wenderoth, Lind & Ponack

[57] ABSTRACT

An apparatus for reproducing a video signal for successive still pictures and a corresponding audio signal, which are recorded on the longitudinal tracks on magnetic tape respectively. The apparatus has rotary magnetic heads for reproducing the video signal and a stationary magnetic head for reproducing the audio signal. The output signals from a plurality of the rotary magnetic heads are gated respectively by respective gate circuits so as to provide the same field of the video signal, and the gated signals are mixed additively by a mixer, so that the same field is reproduced repeatedly and a still picture is displayed on a color TV receiver. The gate circuits are controlled by the vertical synchronizing signal contained in the field of the video signal for each picture and by the control signal provided from a detector for detecting the phase of the rotary magnetic heads, and these signals are provided to the gate circuits through a ring counter, and further these signals are suitably delayed for controlling the gating action so as to reproduce a still picture and to change continuously to reproduce subsequent still pictures.

7 Claims, 21 Drawing Figures

PATENTED MAY 28 1974 3,813,484

SHEET 4 OF 5

MAGNETIC TAPE REPRODUCING SYSTEM FOR STOP MOTION VIDEO WITH AUDIO

This invention relates to a magnetic tape reproducing system, and more particularly to a system for reproducing video signal for successive still pictures and a corresponding audio signal from a magnetic tape.

Conventionally, for presenting both a still picture and a sound program, there is used a slide-projector and a tape recorder, the operation of the slide-projector being synchronized with the tape recorder. However, this operation is very troublesome.

On the other hand, for reproducing only still pictures, there have been proposed various methods, for example as disclosed in U.S. Pat. No. 2,912,493 and Japanese Patent Publication No. 42-10907/1967. However, there are some problems in such a conventional system. For example it is impossible to reproduce the still pictures continuously without breaks or even if the still pictures are to be reproduced continuously without breaks, then the structure of the system becomes very complex, resulting in difficult operation and high cost.

Therefore, the art desires a novel system in which successive still pictures can be continuously displayed on a conventional color television receiver, which system is easy to operate and has a high brightness, and by which sound programs for those still pictures can be reproduced.

Therefore, it is an object of the present invention to provide such novel and improved apparatus for presenting still pictures on a T.V. receiver.

Another object of the invention is to provide an apparatus for reproducing the video signal for successive still pictures, said video signal being recorded on a straight track on magnetic tape in the longitudinal direction of the tape.

A further object of the invention is to provide an apparatus for reproducing the video signal for a still picture and an audio signal for a sound program for said still picture, which are recorded on the same magnetic tape.

These objects are achieved by providing an apparatus comprising a magnetic tape having first and second longitudinal tracks thereon, the video signal for a plurality of still pictures, including a vertical synchronizing signal in each field of said successive pictures, being recorded on said first track of said magnetic tape and said audio signal being recorded on said second track of said magnetic tape, tape moving means for moving said magnetic tape, a stationary magnetic transducer for reproducing said audio signal recorded on said second longitudinal track of said magnetic tape, magnetic transducing means for reproducing said video signal recorded on said first track, said magnetic transducing means comprising a rotating drum and a plurality of rotary magnetic heads which are arranged on the inner periphery of said rotative drum at positions equally spaced from each other, said magnetic tape being wound around said drum at least for a length corresponding to two successive fields of said video signal on said first track and the distance between two adjacent rotary magnetic heads being arranged to be nearly equal to the length of the magnetic tape corresponding to one field of said video signal, signal processing means coupled to said plurality of rotary magnetic heads for gating respectively the reproduced video signals picked up by said plurality of rotary magnetic heads, mixing means connected to said signal processing means for mixing additively the gated signals provided by said signal processing means, separating means connected to said mixing means for selectively separating said vertical synchronizing signal from the video signal provided from said mixing means, detecting means for generating a control signal by detecting the rotating phase of said drum, and control means driven by said vertical synchronizing signal provided from said separating means and said control signal provided from said detecting means for providing a gating signal to said signal processing means so as to gate respectively the video signal of a complete field between the two adjacent vertical synchronizing signals for each of said plurality of rotary magnetic heads, successively in the order of rotation of said plurality of rotary magnetic heads.

These and other objects and features of the present invention will become apparent from the following description, when taken in conjunction with the accompanying drawings, in which.

Figure 6:
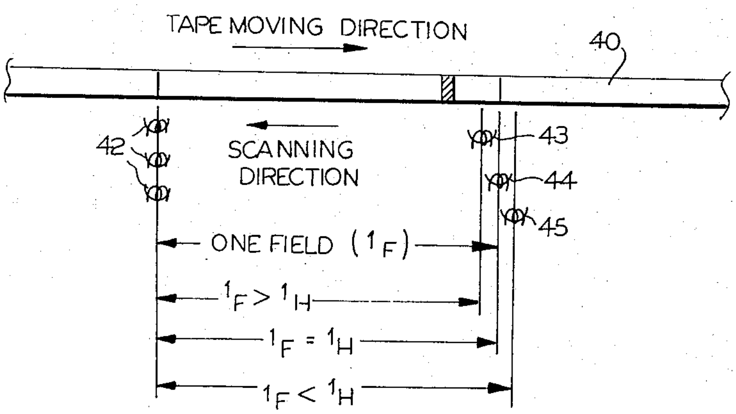
FIG. 6 is a diagram of a part of the magnetic tape for explaining the relation between the length of one field of the video signal and the distance between two rotary magnetic heads.
Figure 7A:
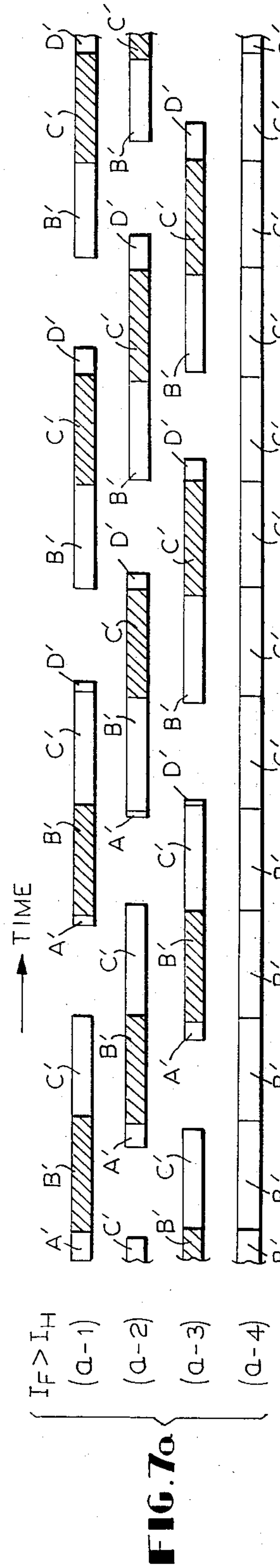
Figure 7B:
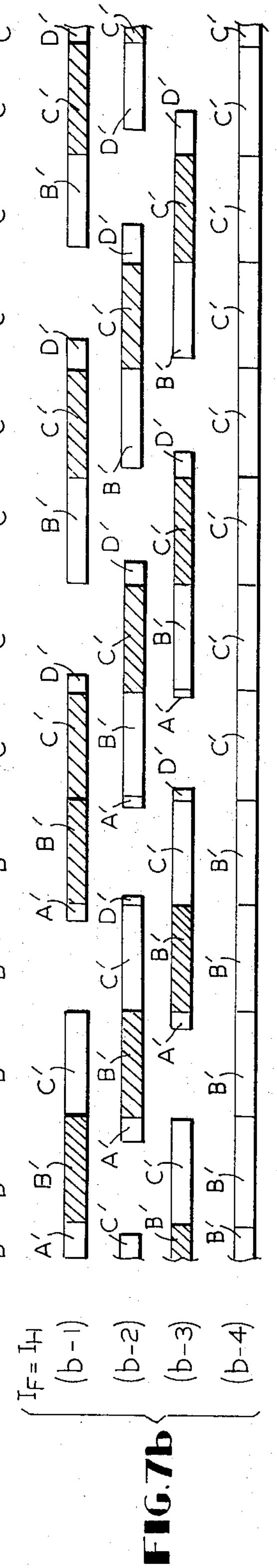
Figure 7C:
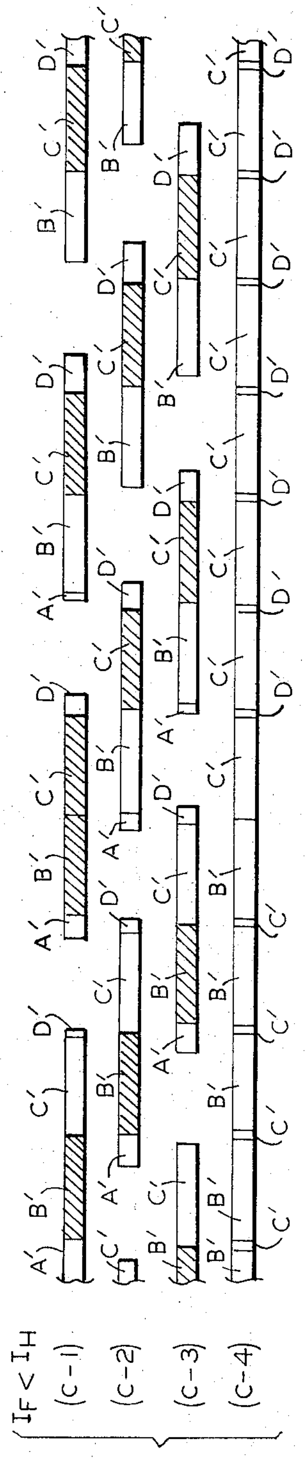

FIG. 7*a* – 7*c* are diagrams of the patterns of the video signals reproduced by three rotary magnetic heads for each case shown in FIG. 6.

Figure 2:
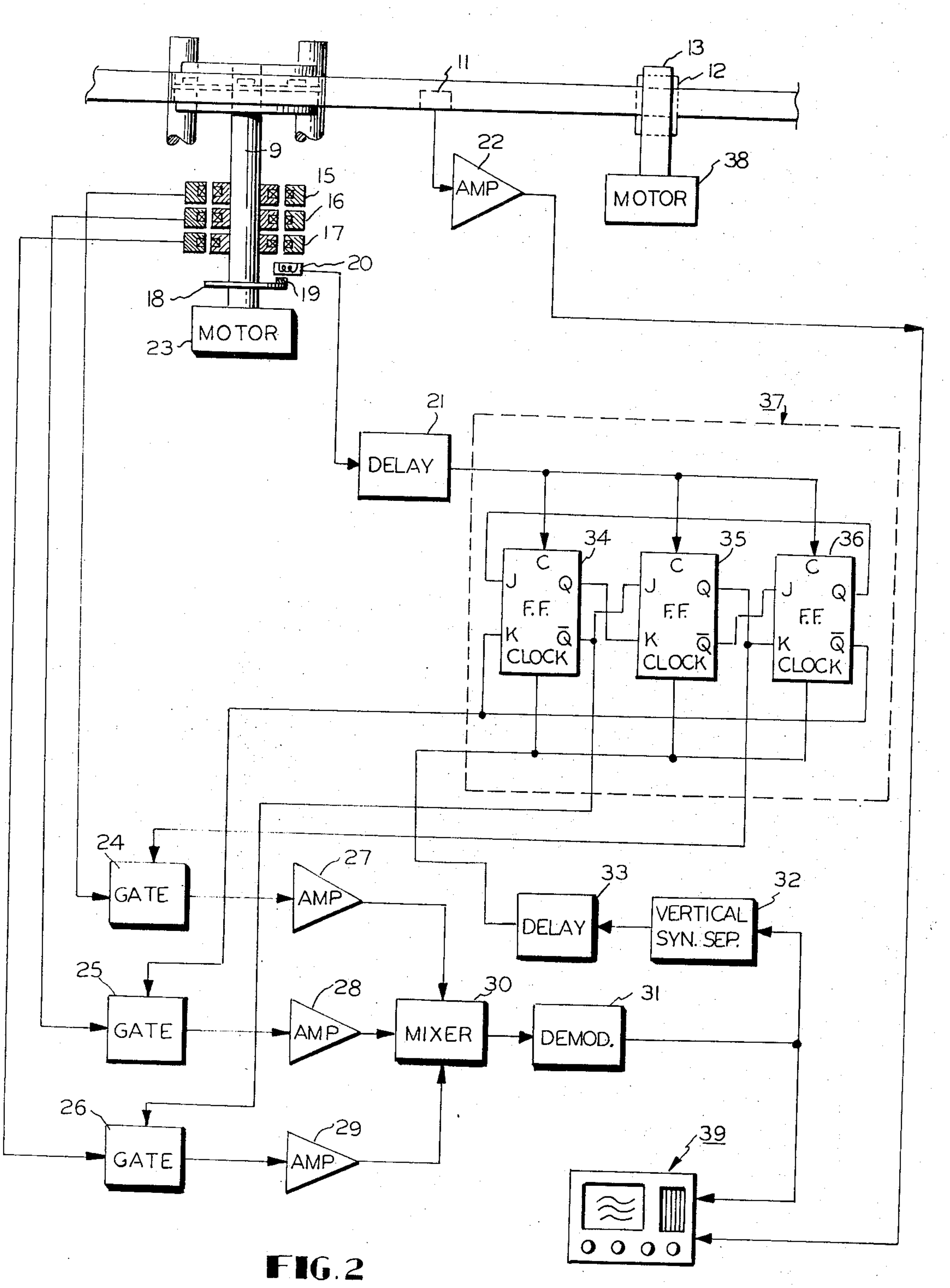
FIG. 2 is an elevation view of the head assembly and the tape moving means shown in FIG. 1 and a circuit diagram of an embodiment of the invention.

FIG. 8*a* – 8*i* are diagrams of the video signal reproduced by the three rotary magnetic heads and various waveforms of the signals provided at the corresponding parts of the circuit shown in FIG. 2.

Figure 1:
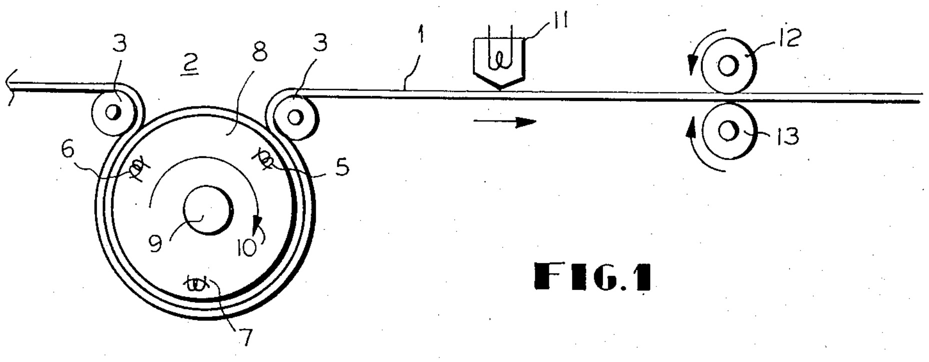
FIG. 1 is a schematic plan view of a head assembly of three rotary magnetic heads and means for moving a magnetic tape in one embodiment of the apparatus of the invention.

Now, referring to FIGS. 1 and 2, in the apparatus according to the present invention, a magnetic tape designated by a reference numeral 1 is moved to the direction of the arrow 4 at a constant speed by a pinch roller 12 and a capstan 13. The capstan is coupled to a motor 38. The magnetic tape 1 is also wound around a rotating drum 8 which is rotating clockwise in the direction of arrow 10, as shown in FIG. 1.

Figure 3:
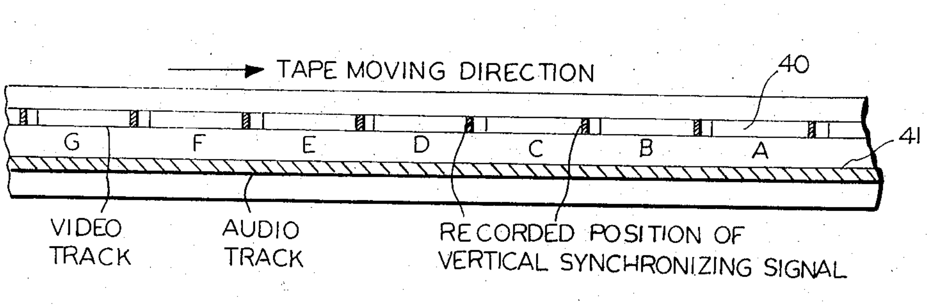
FIG. 3 is a view of a part of the magnetic tape used in the apparatus of the invention for explaining the two recording tracks thereon on which the video signal and the audio signal are recorded respectively.

The magnetic tape 1 to be used in the apparatus of the invention has two recording tracks 40 and 41, as shown in FIG. 3, for recording a video signal and an audio signal, respectively. The video signal comprises a plurality of fields A, B, C, . . . corresponding to a plurality of still pictures, and it contains a vertical synchronizing signal in each field.

The audio signal recorded on the track 41 of the magnetic tape 1 is reproduced by a stationary magnetic head 11 shown in FIGS. 1 and 2 during movement of the tape. The reproduced audio signal is supplied to an amplifier 22 and the amplified audio signal is transduced through a speaker in the television receiver 39. The amplifier 22 has suitable frequency characteristics for the signal provided from the magnetic head 11, and it may contain some equalizing stages so as to compensate for the loss and frequency discrimination due to the characteristic of the magnetic head 11. When the output signal from the amplifier 22 is applied to the monitor television receiver 39 on which the reproduced still picture is displayed as described hereinafter, it is possible to hear the sound program while watching the displayed relating still picture.

The video signal recorded on the track 40 of the magnetic tape 1 is reproduced by a magnetic transducing means which comprises a rotating drum 8 and a plurality of rotary magnetic heads. In the embodiment shown in FIGS. 1 and 2, three rotary magnetic heads 5, 6 and 7 are used, and hereinafter the operation of the apparatus of the invention will be described for an embodiment with three rotary magnetic heads.

The three rotary magnetic heads 5, 6 and 7 are positioned close to the inner curved periphery of the rotating drum 8 at equal distances from each other. The drum 8 is fixed to a shaft 9 which is driven by a motor 23. A length of the magnetic tape 1 is wound around the drum 8 which is more than two-thirds of the circumference of the drum, and the magnetic tape 1 is kept in a close contact with the drum by guide rollers 3 and 3'.

The length of each of the fields A, B, C, . . . of the video signal recorded on the magnetic tape 1 is the same, and the length is nearly equal to the distance between two adjacent rotary magnetic heads on the drum 8. The length of the magnetic tape wound around the drum 8 between the guide rollers 3 and 3' is equal to or longer than the length of the video track 40 on which two fields of the video signal are recorded. Therefore, the portion of the magnetic tape wound around the drum 8 contains a video signal corresponding to at least one complete field. In the arrangement in FIG. 4, the magnetic tape on the drum 8 contains a complete field B and a portion of each of the fields A and C and the complete field B is scanned by the rotary magnetic heads 5, 6 and 7 in order of their rotation. In the arrangement in FIG. 5, the magnetic tape against the drum 8 contains two complete fields B and C.

Figure 4:
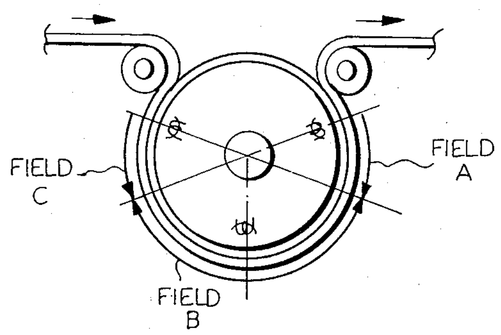
FIGS. 4 and 5 are plan views of the head assembly of three rotary magnetic heads for explaining the operation of the apparatus of the invention.

Referring to FIG. 4, the complete field B and the partial fields A and B are scanned by the rotary magnetic heads 5, 6 and 7 in the order of their rotation, respectively. Therefore, the reproduced video signal from the magnetic transducing means comprises the complete field B and the partial fields A and C. Then, as will be described hereinafter, in order to pick out the complete field B, the signals provided from the rotary magnetic heads 5, 6 and 7 are gated successively by a signal processing means and the gated video signals are mixed additively by a mixing means, so that a still picture of the field B is provided by repeated reproduction of the same field for plurality of times.

During the movement of the magnetic tape 1, the position of the complete field B on the drum 8 moves forwardly from the position shown in FIG. 4. However, as long as the tape on the drum 8 contains the complete field B, it can be reproduced by the rotary magnetic heads 5, 6 and 7, and there is provided a still picture of the complete field B. Further, when the tape on the drum 8 no longer contains the complete field B in as a result of the tape movement, the tape on the drum 8 will then contain the complete field of the subsequent field C. Then, by the operation of a control means, which will be described hereinafter, the gating of the signal processing means is changed so as to pick up the complete field C in the reproduced video signals provided from the rotary magnetic heads 5, 6 and 7.

Figure 5:
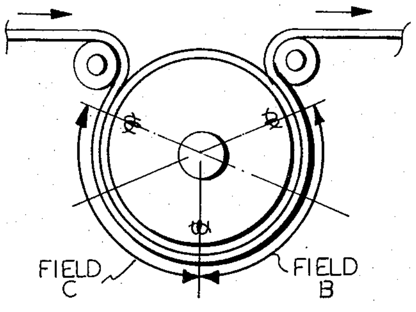

Referring to FIG. 5, the magnetic tape on the drum 8 contains the two complete fields B and C of the video signal. This corresponds to the time when the still picture reproduced and displayed on the monitor TV is changed from the field B to the field C. In this case, the complete fields B and C are alternately reproduced by the rotary magnetic heads 5, 6 and 7, respectively. That is, the rotary magnetic head 5 reproduces at first the complete field B and subsequently reproduces the complete field C. Therefore, the gating operation of the signal processing means is controlled by the control means and a detecting means, which will be described hereinafter, coupled to the rotating drum 8 so as to gate, for example, at first the signal of the complete field B reproduced by the rotary magnetic head 5, and to gate next the signal of the complete field C reproduced by the same rotary magnetic head 5, and then after that first gating of the complete field C from the head 5 to gate subsequently the signal of the same complete field C repeatedly reproduced by the three rotary magnetic heads in the order of rotation, i.e. from the head 6 and then from the head 7. Accordingly, even while the magnetic tape 1 is moving, the still picture can be successively reproduced from the field B and then the subsequent field C without a break between the two fields B and C.

In the apparatus of the invention, it is desirable that the distance between each two adjacent rotary magnetic heads of the plurality of rotary magnetic heads, which are arranged on the inner periphery of the rotating drum, be equal to or less than the length of one field of the video signal on the magnetic tape.

FIG. 6 shows the relation between the length of one field of the video signal and the distance between two adjacent rotary magnetic heads. In FIG. 6, two heads are arranged in the same plane for ease of explanation. The magnetic head 42 corresponds to the rotary magnetic head 5, and magnetic heads 43, 44 and 45 correspond to the rotary magnetic head 6 placed at various distances $1_H$ from the rotary magnetic head. The length of the one field of the video signal is designated by $1_F$. Therefore, the rotary magnetic head 6 for the cases of $1_F>1_H$, $1_F=1_H$, and $1_F<1_H$ is at positions corresponding to the positions of the heads 44 and 45, respectively in FIG. 6. Because the three rotary magnetic heads 5, 6 and 7 are distances at equal distances from each other, the relations of the other two heads are also the same as shown in FIG. 6.

FIGS. *7a–7c* show the patterns of the signals reproduced by each of the rotary magnetic heads 5, 6 and 7 for each case shown in FIG. 6. That is, in FIG. *7a*, (a–1), (b–1) and (c–1) are the signals reproduced by the magnetic head 5 in the cases where the length of one field of the video signal is longer, equal to and shorter than the distance between the magnetic heads 5 and 6, respectively. Similarly, in FIG. *7b* (a–2), (b–2 and (c–2) are the signals reproduced by the magnetic head 6 for these three cases, respectively, and in FIG. *7c* (a–3), (b–3) and (c–3) are the signals reproduced by the magnetic head 7 for each case, respectively. The references A', B' and C' designate the reproduced signal of the fields A, B and C recorded on the magnetic tape. Pattern (a–4) shows the signal synthesized by adding each of the signals in patterns (a–1), (a–2) and (a–3) by gating and mixing as described hereinbefore. Similarly, patterns (b–4) and (c–4) are the signals which are added from patterns (b–1) (b–2) and (b–3), and (c–1), (c–2) and (c–3), respectively. The hatched fields designate the fields to be gated. As described hereinbefore, when the reproducing changes from the field B to C, these two fields are subsequently gated from the signal reproduced by the magnetic head 5 as shown in FIGS. 7*a*–7*c*.

As is obvious from FIGS. 7*a* – 7*c* when the length of one field is less than the distance between the two rotary magnetic heads, i.e. $1_F > 1_H$, a portion between reproductions of one field contains a part of another field and this becomes undesired noise. Further, when recording the video signal on the magnetic tape, there is sometimes a break between the two adjacent fields, and therefore noise is apt to be caused when reproducing such a signal. In the other two cases of $1_F > 1_H$ and $1_F = 1_H$, there is no such problem. Although in case of $1_F > 1_H$ the number of horizontal scanning lines decreases, there is practically no problem watching the still picture displayed on the monitor TV even if the number of horizontal scanning lines decreases to nearly 260 lines. Therefore, it is desirable to make the distance between the two adjacent rotary magnetic heads a little less than the length of one field of the video signal.

As described above, the length of magnetic tape wound around the drum 8 is more than the length of two fields of the video signal on the track 40 of the magnetic tape. Therefore, when the length of one field is 167 mm. a length of which is about one-five hundredth of the length of the magnetic tape in one cartridge of a standard audio cassette tape (C–60 type), the circumferential length of the drum 8 will be nearly 500 mm because 167 × 3 ≈ 500. Therefore, when the motor 23 rotates at 20 rps, the circumferential speed of each of the rotary magnetic heads 5, 6 and 7 will be nearly 10 m/sec (=20rps × 500mm). The video signal in the standard NTSC color television system usually contains signal components having frequencies of zero to 4 MHz, and such a signal can be substantially completely reproduced on the usual color TV of such a system at such a circumferential speed of the rotary magnetic heads. Therefore, about 1,000 frames of still color pictures can be recorded on the tape of the one cartridge of the usual audio cassette tape (C–60) type for displaying on a color monitor TV when they are recorded so as to permit operation of the tape in both directions. The tape speed in the usual audio cassette player is about 4.75 cm/sec. When the magnetic tape 1 in FIGS. 1 and 2 is moved at such a speed of about 4.75 cm/sec. the time during which one complete field having a length of 167 mm is on the drum 8 is about 3.6 seconds. Therefore, the time one still color picture is displayed on the monitor TV is about 3.6 seconds if the tape of one audio cassette (C–60type) is used. Accordingly, there can be about 1,000 still color pictures displayed on the monitor TV together with the sound programs for these pictures during hour by using one cassette (C–60 type). This is very effective for many applications such as various audio-visual information services such as travel guide, amusement uses, instructional uses, etc.

The speed of the magnetic tape 1 can be controlled by providing a speed control means (not shown) for the motor 38 shown in FIGS. 1 and 2, for speeds from zero (stopping of the tape) to a desired speed. By changing the speed of tape movement. the time that a still picture is displayed can be easily changed. When the magnetic tape 1 is stopped, the still picture is also reproduced as described hereinbefore, and in this case the same still picture is reproduced until the magnetic tape is moved. Further, in this case, when the two complete fields are positioned on the drum as shown in FIG. 5, either of the two still pictures can be produced by controlling the gating action of the signal processing means as described hereinafter.

There will now be described the circuit diagram for providing the continuous reproduced signal, as shown by patterns (*a*–4), (b–4) and (c–4) in FIGS. 7*a*–7*c*, with reference to FIGS. 2 and 8*a*–8*l*

Figures 8A, 8B, 8C, 8D, 8E, 8F, 8G, 8H, 8I, 8J, 8K, 8L:
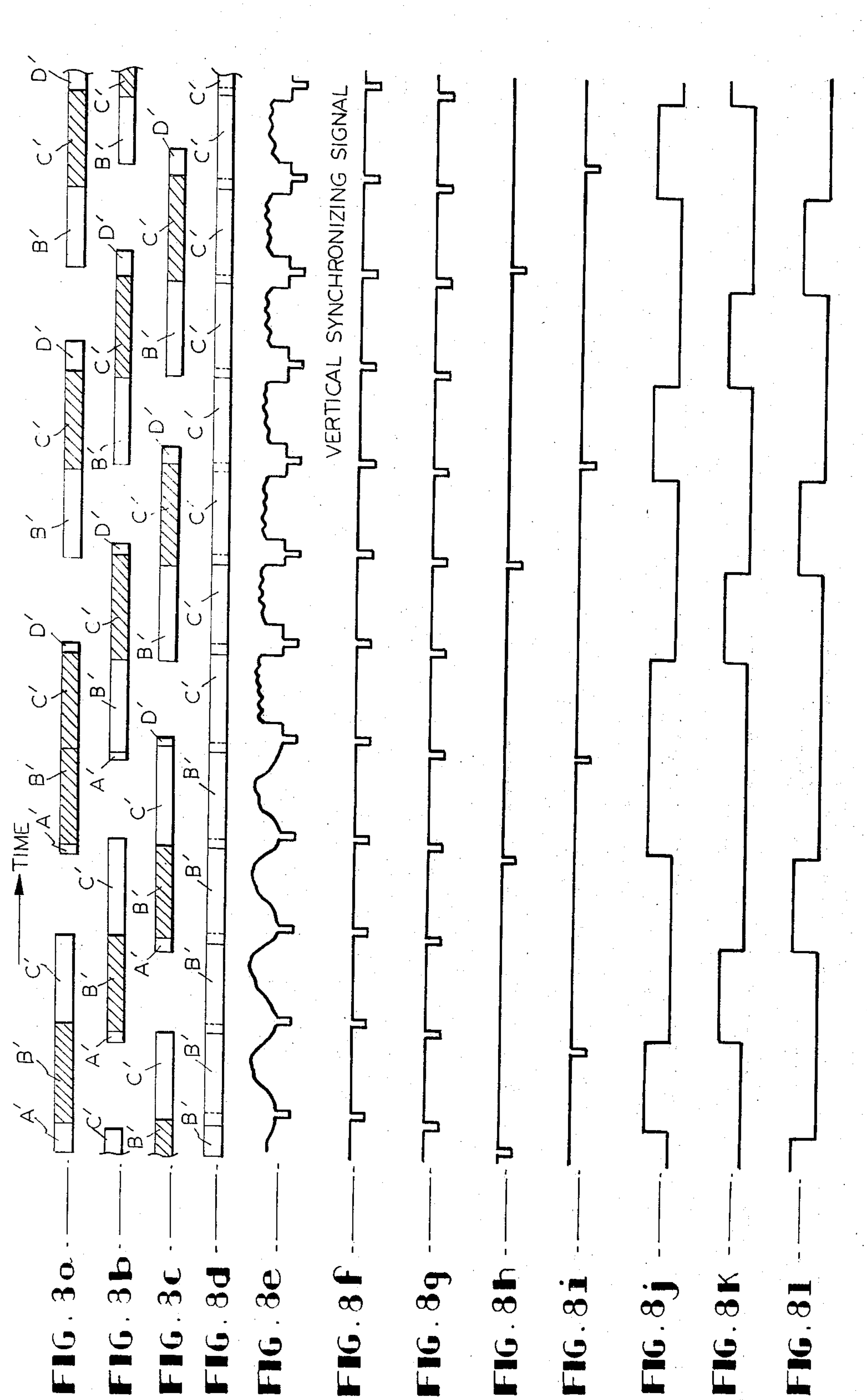

FIGS. 8*a*, 8*b* and 8*c* show the output signals reproduced by the rotary magnetic heads 5, 6, and 7, respectively, where the length of one field of the video signal is longer than the distance between the two adjacent rotary magnetic heads. These output signals are the same as those of patterns (a–1), (a–2) and (a–3) shown in FIG. 7*a*. The necessary portions are picked from those output signals (a), (b) and (c), respectively so as to provide finally the continuous reproduced signal as shown in FIG. 8*d*. FIG. 2 shows a circuit diagram for carrying out such an operation.

Referring to FIG. 2, the output signals (a), (b) and (c) reproduced by the rotary magnetic heads 5, 6, and 7, respectively are provided out from rotary transformer 15, 16 and 17, which are coupled to the respective rotary magnetic heads 5, 6 and 7, and are supplied therefrom gate circuits 24, 25 and 26, respectively. The gate circuits 24, 25 and 26 form the signal processing means described hereinbefore.

Gating signals shown in FIGS. 8*j*, 8*k*, and 8*l* are applied to the corresponding gate circuits 24, 25 and 26, respectively from a ring counter 37 which comprises three flip-flop circuits as described hereinafter, and at the output terminals of the gate circuits 24, 25 and 26, respectively, there are provided signals corresponding to the hatched portions of FIGS, 8*a*, 8*b* and 8*c* the hatched portions, as shown by (a), (b) and (c) in FIG. 8, of the signals from the respective rotary magnetic heads at These signals gated out from the respective gate circuit are amplified by amplifiers 27, 28 and 29, respectively, and after that the amplified signals are mixed additively by a mixer circuit 30. Then, the signal shown in FIG. 8*d* is provided a the output terminal of the mixer 30.

Usually, in magnetic recording and reproducing, the video signal is frequency modulated for recording so as to prevent fluctuation in the level of the signal and to avoid the difficulty of recording a signal of low frequency. In this case, the signal of FIG. 8*d* mixed by the mixer 30 is demodulated by a demodulator 31 shown in FIG. 2. Then, there is provided a demodulated signal as shown in FIG. 8*e*. By applying the demodulated signal to a monitor TV 39, the reproduced still pictures are displayed on the monitor TV 39. Further, the sound program reproduced by the stationary head 11 is also presented from a speaker of the monitor TV 39 at the same time.

The above described gating signals shown in FIGS. 8*j*, 8*k* and 8*l* are generated as follows. The video signal provided from the demodulator 31 is applied to a separating circuit for separating only the vertical synchronizing signal shown in FIG. 8*f*, which is contained in each field of the video signal, from the demodulated signal of FIG. 8*e*. Then, the separated vertical synchronizing signal is delayed by a delay circuit 33 so as to provide a delayed vertical synchronizing signal shown in FIG. 8*g*. The delay time of the delay circuit 33 is adjustable. The phase of the delayed signal is set so as to coincide with the position between two adjacent fields of the video signal. The dotted line in each of the fields shown in FIG. 8*d* is at the position of the vertical synchronizing signal. The delayed vertical synchronizing signal is then applied to the ring counter 37, which comprises three flip-flop circuits 34, 35 and 36, as a clock input signal thereto as shown in FIG. 2.

On the other hand, a rotating disc 18 mounted on the shaft 9 of the motor 23, and a permanent magnet 19 is fixed on the surface of the dic 18. There is also a stationary magnetic head 20 positioned above the disc 18 so as to detect passing of the permanent magnet 19 thereby. Therefore, there is provided from the magnetic head 20 a control signal pulse for each rotation of the disc 18, as shown in FIG. 8*h*. Because the disc 18 is coupled to the drum 8 through the shaft 9, the pulse signal has a constant phase relation with the rotary magnetic heads 5, 6 and 7. Accordingly, by delaying the output signal from the magnetic head 20 by another delay circuit 21, there is provided a signal, for example having a phase which coincides with the rotating phase of the rotary magnetic head 5, as shown by in FIG. 8*i*. The delay circuit 21 has an adjustable delay time. The rotating disc 18, the permanent magnet 19 and the stationary magnetic head 20 form a detecting means for generating a control signal which is applied to the ring counter 37 so as to control the gating operation, as described hereinafter.

The delayed signal is applied to the ring counter 37 as a set input signal to the three flip-flop circuits 34, 35 and 36, so as to set the circuits for the counting of the delayed vertical synchronizing signal at the time when the reproduced field of the video signal is changed to the subsequent field. In FIG. 8*d*, this is the time when the reproduction is changed from the field B' to the field C' of the different still picture. At this time, the ring counter 37 is set just after counting the delayed vertical synchronizing signal corresponding to the rotary magnetic head 5, and then the ring counter counts again the delayed vertical synchronizing signal from the beginning for the same rotary magnetic head 5 and in the order of the rotation the rotary magnetic heads 5, 6 and 7. Accordingly, the gating signals as seen in FIGS. 8*j*, 8*k* and 8*l* are supplied to the respective gate circuits 24, 25 and 26 from the ring counter 37.

As described hereinbefore, the control system in the apparatus of the invention is characterized by a closed loop where the gating signal is generated from the reproduced video signal, and then according to the reproduced signal gated by that gating signal, a further gating signal is generated. Moreover, the system has further features, namely that the phase of the position between the two adjacent fields of the video signal can be changed suitably by adjusting the delay time of the vertical synchronizing signal by the adjustable delay circuit 33, and that by adjusting the delay time of the control signal by the adjustable delay circuit 21, the rotating phase of the rotary magnetic heads can be suitably changed so as to control the time after which the reproduction of a still picture is changed to the reproduction of the next still picture without a break. The latter features are described in more detail hereinafter.

As described hereinbefore, a length of magnetic tape more than two fields is wound around the drum 8, and the whole circumference of the drum 8 corresponds to the length of almost three fields. Therefore, the time during which a signal is reproduced at each of the rotary magnetic heads 5, 6, and 7 is greater than that for just two fields. For example in case of FIG. 8*a*, the signal second from the left contains the two complete fields B' and C' and also parts of the fields A' D', as shown in the figure. The time during which the two complete fields are reproduced depends on the length of the magnetic tape wound around the drum 8. For example, when the length of one field is 167 mm as described in the above example and the length of the magnetic tape wound around the drum is 364 mm (=167×2+30), the two complete fields are reproduced while the tape is moved through a distance of 30 mm. When the speed of the tape is 47.5 mm/sec. also as in the above example, the time during which the two complete fields are reproduced becomes 0.63 second. Therefore, by suitablely changing the set pulse shown in FIG. 8*i* by the delay circuit 21, the changing of the reproduced still picture can be performed after the above length of time. Such a length of time can be suitably decided by changing the length of the magnetic tape wound around the drum.

Further, when the magnetic tape is stopped while in the arrangement as shown in FIG. 5, either one of the two complete fields B and C can be reproduced by a similar operation of the set pulse as described in the above. There is a further advantage of using a control signal which is a set pulse. That is, although the video signal and the audio signal are recorded on the tracks 40 and 41 at positions corresponding to the location where the still picture is changed to the a subsequent picture and at the location of the stationary magnetic head 11 for audio reproduction, respectively, sometimes there is an apparent deviation of the relative positions of the video reproducing head and the audio reproducing head from the desired relation because of a small error in the tape dimension. Even in such a case, the timing of the reproduction of the still picture and the sound program can be adjusted by adjusting the delay time of the delay circuit 21.

There has been described hereinbefore a preferred embodiment of the invention, and it is apparent that various modifications can be made without departing from the scope of the invention. For example, it is also possible of course to change the time when the reproduction of a still picture is changed to the subsequent one by changing the position of the magnetic head 20 without using the delay circuit 21. Further, the number of the rotary magnetic heads is not limited to three, as is obvious from the description presented hereinbefore. Besides, although the detailed example of circuit configuration of each of the blocks shown in FIG. 2 has been omitted in the above description for convenience of explanation, it is obvious that the usual circuits corresponding to all of these blocks such as the gate circuits, amplifiers mixer, demodulator, separator and delay circuits are well known to those skilled in the art and can be used for the respective blocks in FIG. 2 of the apparatus of the invention.

What is claimed is:

1. An apparatus for reproducing a video signal for a plurality of successive still pictures and a corresponding audio signal, comprising a magnetic tape having first and second longitudinal tracks thereon, said video signal for the plurality of still pictures including a vertical synchronizing signal in the field of each of the successive pictures and being recorded on said first track of said magnetic tape and said audio signal being recorded on said second track of said magnetic tape, tape moving means for moving said magnetic tape, a stationary magnetic transducer along the path of said tape over which the tape runs for reproducing said audio signal recorded on said second longitudinal track of said magnetic tape, magnetic transducing means for reproducing said video signal recorded on said first track, said magnetic transducing means comprising a rotating drum and a plurality of rotary magnetic heads which are arranged on the inner periphery of said rotative drum at positions equally spaced from each other, said magnetic tape being wound around said drum along a portion of the length of the periphery at least equal to the length of two successive fields of said video signal on said first track and the distance between two adjacent rotary magnetic heads being nearly equal to the length of the magnetic tape corresponding to one field of said video signal, signal processing means coupled to said plurality of rotary magnetic heads for gating the respective video signals reproduced by said plurality of rotary magnetic heads, mixing means connected to said signal processing means for mixing additively the gated signals from said signal processing means, separating means connected to said mixing means for separating said vertical synchronizing signal from the video signal from said mixing means, detecting means coupled to said rotating drum for generating a control signal corresponding to the rotating phase of said rotative drum, and control means coupled to said separating means and said detecting means and driven by the vertical synchronizing signal from said detecting means for providing a gating signal and being coupled to said signal processing means for supplying said gating signal thereto for gating, respectively, the video signal of a complete field between the two adjacent vertical synchronizing signals for each of said plurality of rotary magnetic heads, successively in the order of rotation of said plurality of rotary magnetic heads.

2. An apparatus according to claim 1 wherein said control means comprises a ring counter having a plurality of flip-flop circuits equal in number to the number of said rotary magnetic heads, said ring counter being for counting said vertical synchronizing signals so as to gate respectively said video signal for a complete field successively in the order of rotation of said plurality of rotary magnetic heads, and being reset by said control signal so as to change the gating order of said video signals.

3. An apparatus according to claim 1, wherein said magnetic transducing means has three rotary magnetic heads.

4. An apparatus according to claim 1, wherein said separating means includes a delaying means for delaying said vertical synchronizing signal, the delay time of said delaying means being adjustable, whereby by adjusting the delay time of said delaying means the phase of said gating signal is changed with respect to the phase of said vertical synchronizing signal.

5. An apparatus according to claim 1, wherein said detecting means includes a delaying means for delaying said control signal, the delay time of said delaying means being adjustable, whereby by adjusting the delay time of said second delaying means the phase of said gating signal is changed with respect to the phase of said control signal.

6. An apparatus according to claim 1, wherein the distance between two adjacent rotary magnetic heads of said plurality of rotary magnetic heads on the periphery of said rotative drum is at the most equal to the length of said magnetic tape corresponding to one field of said video signal so as to prevent the presence of an unwanted signal in the field of the reproduced video signal.

7. An apparatus according to claim 1, wherein said tape moving means includes a speed control means for controlling the speed of movement of the tape so as to change the time for which one of the successive still pictures is reproduced.

* * * * *